United States Patent [19]
Ryzin et al.

[11] Patent Number: 6,065,075
[45] Date of Patent: May 16, 2000

[54] I/O PORT SIGNAL CONVERSION APPARATUS AND METHOD

[75] Inventors: John Van Ryzin, Madison; Adrian Parvulescu, Park Ridge, both of N.J.

[73] Assignees: Sony Corporation, Tokyo, Japan; Sony Electronics, Inc., Park Ridge, N.J.

[21] Appl. No.: 09/061,828

[22] Filed: Apr. 16, 1998

[51] Int. Cl.⁷ .................................................. G06F 13/00
[52] U.S. Cl. ........................................... 710/65; 710/131
[58] Field of Search ........................... 439/638; 348/232; 340/552; 386/82; 482/7; 379/1; 370/254; 375/219; 455/2; 710/131, 65

[56] References Cited

U.S. PATENT DOCUMENTS

| | | | |
|---|---|---|---|
| 5,226,177 | 7/1993 | Nickerson | 455/2 |
| 5,591,104 | 1/1997 | Andrus et al. | 482/7 |
| 5,668,917 | 9/1997 | Lewine | 386/52 |
| 5,781,108 | 7/1999 | Jacob et al. | 340/582 |
| 5,815,201 | 9/1998 | Hashimoto | 348/282 |
| 5,815,205 | 9/1998 | Hashimoto et al. | 439/638 |
| 5,867,484 | 2/1999 | Shaunfield | 370/254 |
| 5,966,427 | 10/1999 | Shaffer et al. | 379/1 |
| 5,983,449 | 8/1999 | Meyer | 375/219 |

*Primary Examiner*—Christopher B. Shin
*Attorney, Agent, or Firm*—Frommer Lawrence & Haug, LLP.; William S. Frommer

[57] ABSTRACT

I/O port signal conversion apparatus for converting between I/O port signals of a first voltage level coupled from or supplied to an I/O port of a computer and A1 signals of a second voltage level supplied to or coupled from audio/video equipment arranged in an S-LINK cable bus system with an S-LINK cable bus. The computer inserts into the I/O port signals audio/video equipment headers that flag respective audio/video equipment which poll the S-LINK cable bus. A plug couples the I/O port signals and the A1 signals between the I/O port and the S-LINK cable bus system. A voltage control circuit disposed within the plug converts between the voltage level of the I/O port signals and the voltage level of the A1 signals.

28 Claims, 8 Drawing Sheets

I/O PORT SIGNAL CONVERSION APPARATUS AND METHOD

BACKGROUND OF THE INVENTION

1. Field of the Present Invention

The present invention is directed to a converter and, more particularly, to a novel, low-cost serial RS-232 connector/converter for connecting a computer to audio/video (A/V) equipment and converting between RS-232 signals and audio/video control signals.

2. Description of the Related Art

VCRs, TVs, CD players, tuners and other audio/video equipment today are "daisy-chained" together as illustrated, for example, by the A1 (S-LINK) cable entertainment system of FIG. 6. The S-LINK cable system shown busses audio/video control signals (A1 signals) between the audio/video equipment which poll the S-LINK bus for A1 signals pertaining thereto. Such entertainment systems are becoming increasingly widespread due, in part, to the ease in which the audio/video equipment are connected and replaced in such systems.

The Sony Vision Touch device 16 shown in FIG. 7 is a commercially available external device which is specially adapted to interface a computer to the audio/video equipment connected in the Sony cable bus entertainment system shown in FIG. 6. Briefly, Sony Vision Touch device 16 employs a devices protocol to convert Vision-Touch codes (VT codes) (unique to the Sony Vision Touch system) generated by computer 18 into A1 signals which are bussed to the appropriate audio/video equipment via the S-LINK cable bus entertainment system.

More particularly, computer 18 generates VT codes corresponding to user commands and outputs the VT codes through the usual RS-232 connector to serial S-LINK daisy chained to the equipment. Microcontroller 26 of Sony Vision Touch device 16, with the aid of buffer 28, converts the received VT codes into corresponding A1 signals using the devices protocol. Timing control circuit 30 and voltage control circuit 32 respectively correct the timing and voltage of the A1 signal to conform with the requirements of the S-LINK cable bus system. The converted signals are then placed on the S-LINK cable bus and each audio/video device polls the bus for A1 signals containing the respective audio/video equipment header. Power is supplied to Sony Vision Touch device 16 via local power supply 34.

The next generation of computers are expected to provide multimedia software applications which process, in real time, the audio/video signals of such S-LINK entertainment systems. It is expected that many manufacturers will provide peripheral equipment which support such multi-media computers and some of the factors which will determine success will include the cost of production and power consumption of such peripheral equipment. Thus, a serial RS-232 device will be needed which transmits audio/video control signals.

OBJECTS AND SUMMARY OF THE INVENTION

It is an object of the present invention to provide a novel, low-cost RS-232 connector/converter which conserves power and transfers control data.

It is another object of the present invention to provide an I/O port connector/converter which connects the I/O port of a computer directly to the S-LINK cable bus system without external devices.

It is still another object of the present invention to provide an I/O port connector/converter which is powered by the I/O port signal instead of a local power supply.

It is a further object of the present invention to provide an I/O port connector/converter which is integrated into the I/O port plug of an I/O port cable.

Various other objects, features and advantages according to the present invention will become apparent from the following detailed description of the illustrated embodiments when read in conjunction with the accompanying drawings in which corresponding components are identified by the same reference numerals.

In accordance with the foregoing objectives, the present invention provides a novel I/O port signal conversion apparatus for converting between I/O port signals of a first voltage level coupled to an I/O port of a computer and A1 signals of a second voltage level for digitally controlled audio/video equipment coupled by an S-LINK cable bus. In a system in which the computer inserts, into the I/O port signals, audio/video equipment headers that flag respective audio/video equipment which poll the S-LINK cable bus, the I/O port signal conversion apparatus of the present invention includes a plug which couples the I/O port and A1 signals between the I/O port and the S-LINK cable bus system and a voltage control circuit disposed within the plug which converts between the first voltage level of the I/O port signals and the second voltage level of the A1 signals.

In another aspect of the present invention, the plug is disposed along the side of a housing, and a voltage control circuit is disposed within the housing for converting between the first voltage level of the I/O port signals and the second voltage level of the A1 signals.

BRIEF DESCRIPTION OF THE DRAWINGS

A more complete appreciation of the present invention and many of its attendant advantages will be readily obtained by reference to the following detailed description considered in connection with the accompanying drawings, in which.

DETAILED DESCRIPTION OF THE PREFERRED EMBODIMENTS

Figure 1:
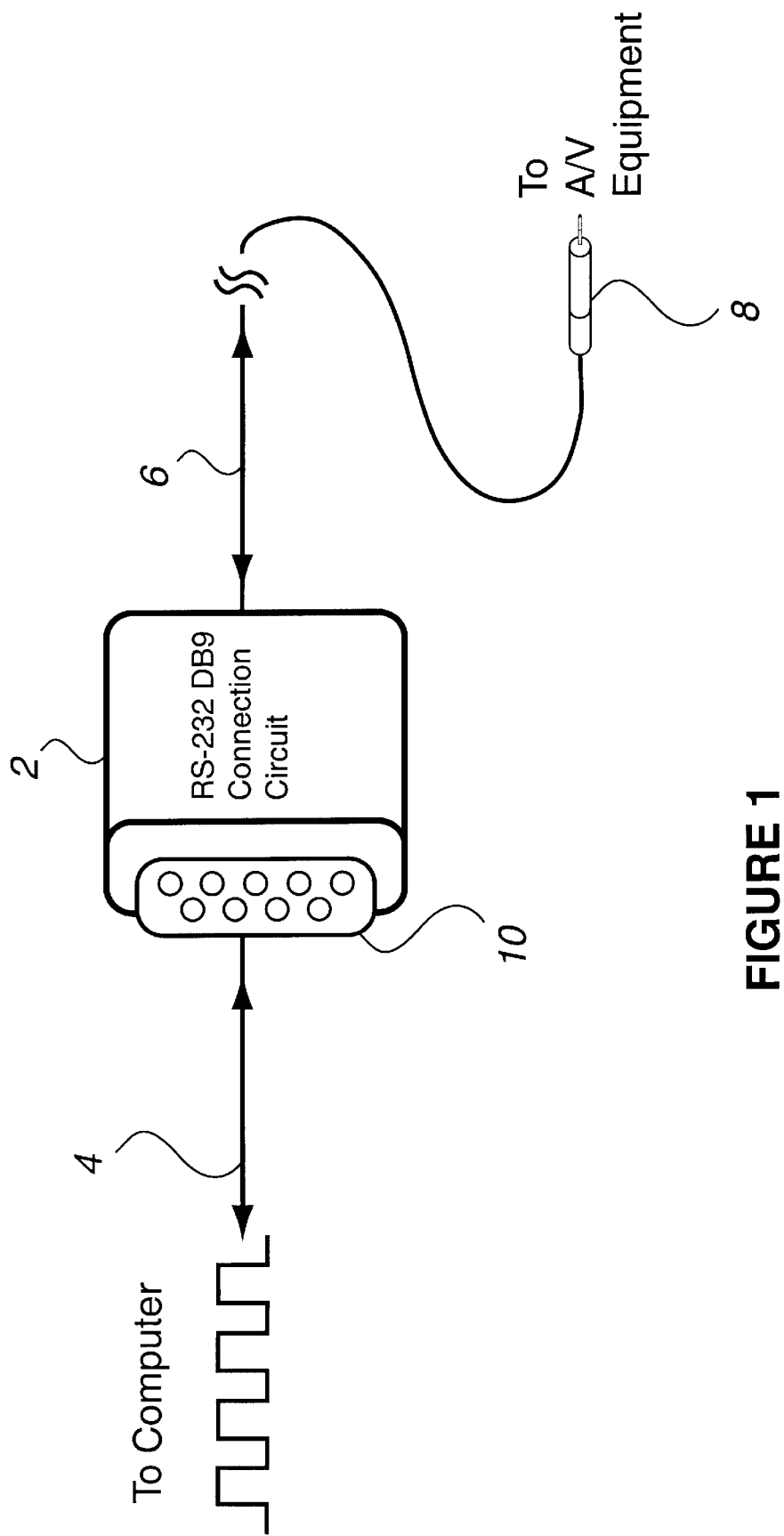
FIG. 1 illustrates the RS-232 connector/converter of the present invention.

FIG. 1 shows RS-232 connection circuit 2 of the present invention which connects directly to the RS-232 port of a computer, such as a personal computer, and receives RS-232 signals 4 therefrom. RS-232 connection circuit 2 corrects the voltage of the RS-232 signals in accordance with the voltage requirements of the S-LINK cable bus system and couples, via cable 6 and jack 8, the voltage-corrected RS-232 signals directly to the S-LINK cable bus. RS-232 connection circuit 2 of the present invention further corrects the voltage of A1 signals generated by the S-LINK cable bus system in accordance with the requirements of the RS-232 standard and couples, via pins 10, the voltage-corrected A1 signals from the S-link cable bus directly to the RS-232 port of the computer.

Of course, the present invention is not necessarily limited to an RS-232 connection, but may be any I/O port connection between a computer and an S-LINK cable bus system. Thus, for example, the connection circuit of the present invention may be a COM port, LPT port or USB (Universal Serial Bus) connection. Similarly, the computer is not necessarily limited to a personal computer but may be, for example, a lap top, palm top or internet TV.

In the preferred embodiment, RS-232 connection circuit 2 is comprised of a single-housing including an RS-232 plug with pins 10 which plug directly into the RS-232 port of any RS-232 compatible device. Preferably, the single-housing of RS-232 connection circuit 2 of the present invention is plug-shaped having substantially the size and shape of a conventional 9-pin RS-232 plug. It shall be appreciated that, this single-housing arrangement makes installation simple because the RS-232 connection circuit plugs directly into the RS-232 port. The present invention employs no extraneous devices and cables with this single-housing arrangement which are unsightly and confusing to install.

It is preferred that jack 8 is an A1 mini plug jack which connects directly into a complementary input of the audio/video equipment. With the present invention, there is no need for installation manuals because the RS-232 connection circuit is plugged directly into the RS-232 port of the computer and the A1 mini plug jack is plugged into any complementary input of the audio/video equipment.

The RS-232 connection circuit 2 uses minimal power, such that the connection circuit of the present invention need be powered solely by the RS-232 signals. With this arrangement, power is conserved, electrical outlets are unneeded and installation is made even easier.

Figure 2:
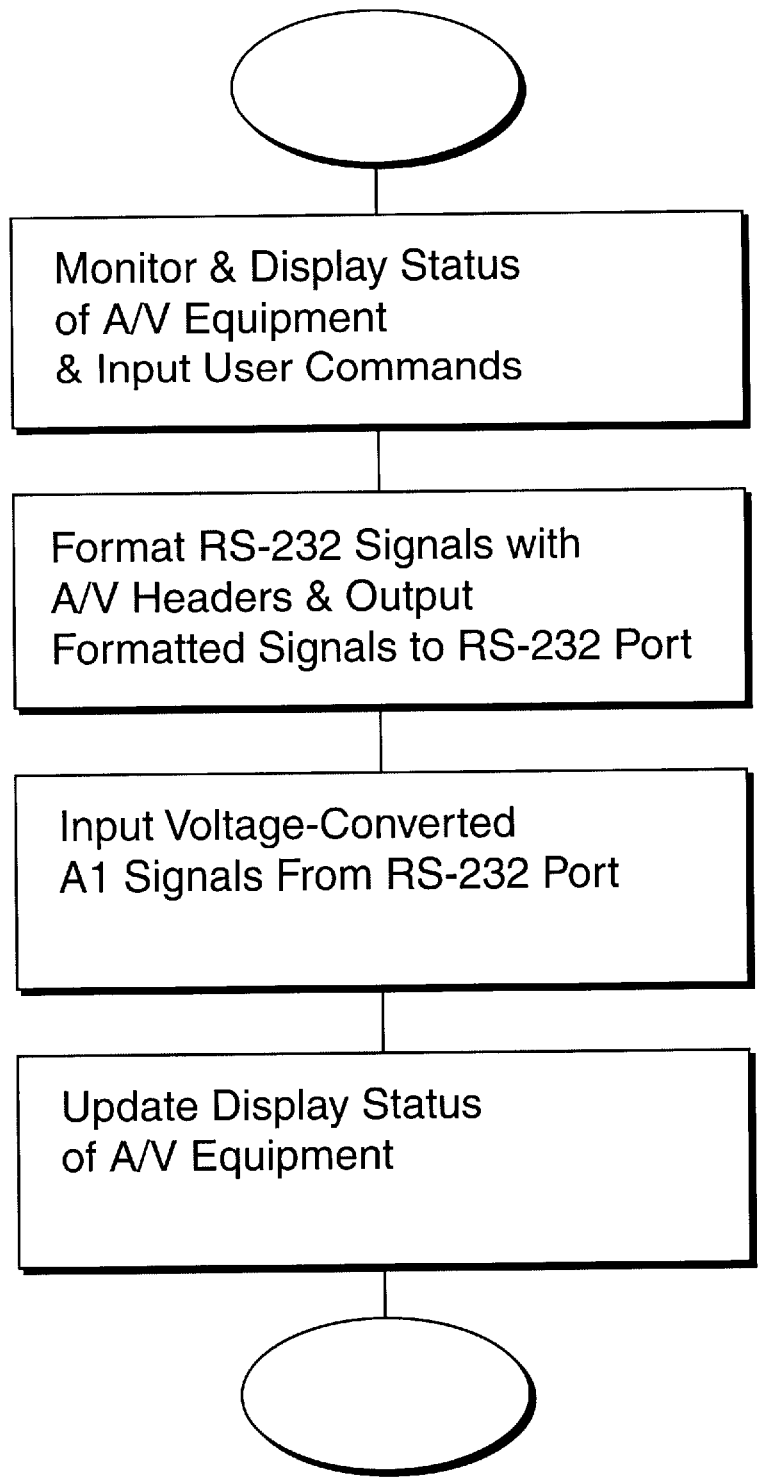
FIG. 2 is a flow chart of a multi-media software routine performed in accordance with the present invention.

Multi-media software monitors and controls the audio/video equipment via RS-232 connection circuit 2 of the present invention as represented by the routine illustrated in FIG. 2. Preferably, the multi-media software routine is a computer application which is executed by the computer connected to the RS-232 connection circuit to display the status of the audio/video equipment and to generate RS-232 signals in response to user commands. It is preferred that the multi-media software routine formats the RS-232 signals to include respective audio/video headers such that the intended audio/video equipment, which polls the S-LINK cable bus, extracts the pertinent RS-232 signals from the bus. It is also preferred that the multi-media software routine processes the A1 signals transmitted to the computer from the S-LINK cable bus system according to the respective audio/video headers. It shall be appreciated that this reduces circuit complexity because the multi-media software routine obviates the need for complex circuitry to convert the format of the RS-232 and A1 signals which are significantly different from each other.

In the preferred embodiment, the multimedia software is packaged as PC CD-ROM software. However, the software may also be bundled with a 200 CD changer.

The present invention may also be made wireless using 900 MHz technology. More specifically, the RS-232 and A1 signals are transmitted and received by 900 MHz devices which obtain power from, for example, a 110-volt wall outlet. This would allow the user to control the audio/video equipment using a computer located in another room.

In operation, the user plugs RS-232 connection circuit 2 of the present invention directly into the RS-232 port of his computer and inserts jack 8 into an input/output of his audio/video equipment of the S-LINK cable bus entertainment system. RS-232 signals 4, which are formatted by the multi-media software run on the computer to include audio/video equipment headers, are coupled from the RS-232 port to pins 10 of RS-232 connection circuit 2. The formatted RS-232 signals are voltage-converted by RS-232 connection circuit 2 into A1 signals in accordance with the voltage requirements of the S-LINK cable bus and coupled, via cable 6 and jack 8, to the bus. Whereupon, a particular piece of audio/video equipment polls the S-LINK cable bus for A1 signals containing its respective audio/video equipment header.

A1 signals generated by the audio/video equipment of the S-LINK cable bus system are coupled, via jack 8 and cable 6, to RS-232 connection circuit 2 of the present invention and voltage-converted by a voltage control circuit 12 (to be described in conjunction with FIG. 3) in accordance with the RS-232 standard. The voltage-converted A1 signals are then coupled, via pins 10, to the RS-232 port of the computer where they are stored in a local register of the computer. The multi-media software run by the computer processes the converted A1 signals to, for example, display information to the user about a particular piece of audio/video equipment.

Thus, the RS-232 connection circuit is inexpensive, conserves power, is not complex and transmits audio/video control signals.

It is a feature of the present invention to construct the RS-232 connection circuit in a single housing. The single-housing design of reduced circuit complexity of the present invention is much less expensive to construct than external devices. The present invention, which requires minimum power, may be powered by the RS-232 port; thereby obviating the need for a local power supply and further reducing cost.

Figure 3:
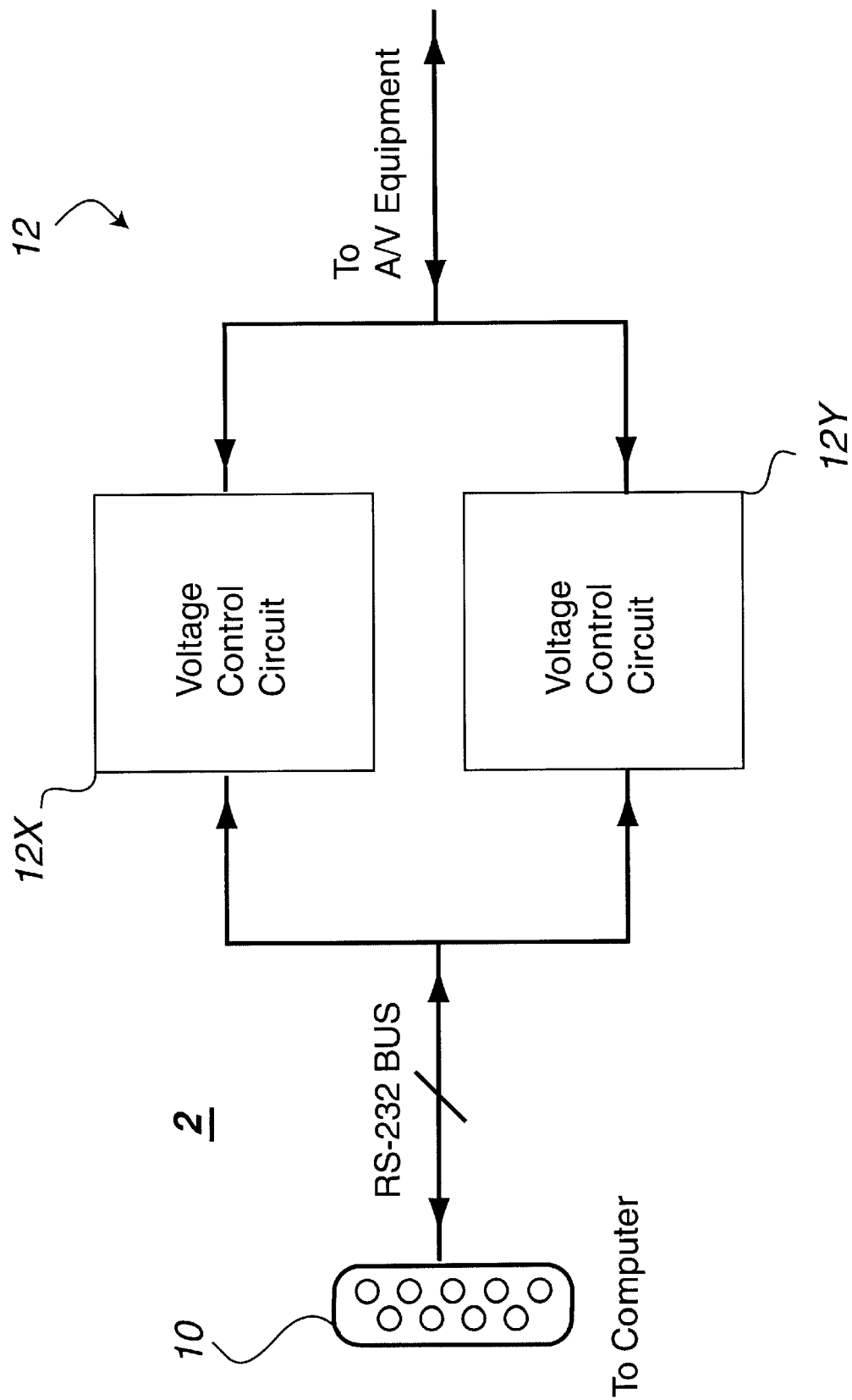
FIG. 3 illustrates one embodiment of the invention shown in FIG. 1.

FIG. 3 shows one embodiment of the RS-232 connection circuit of FIG. 1, wherein RS-232 connection circuit 2 of the present invention includes pins 10 and voltage control circuit 12.

Preferably, and as mentioned above, pins 10 of RS-232 connection circuit 2 are arranged according to the RS-232 IEEE standard such that the RS-232 connection circuit of the present invention may be plugged into any RS-232 port. It is preferred that RS-232 connection circuit 2 of the present invention is powered through the power pin of the RS-232 port.

It also is preferred that voltage control circuit 12 of FIG. 3 comprises complementary first and second voltage control circuits 12$x$, 12$y$ which respectively voltage-convert the RS-232 and A1 signals transmitted in opposite directions. In this arrangement, the first voltage control circuit 12$x$ voltage-converts the formatted RS-232 signals into A1 signals and the second voltage control circuit 12$y$ voltage-converts the A1 signals into RS-232 signals. Advantageously, this arrangement obviates the need for a flow control circuit, thereby reducing the circuit complexity of RS-232 connection circuit 2 of the present invention.

The IEEE RS-232 standard prescribes +/−12 volts for RS-232 signals. The S-LINK cable bus system, on the other hand, prescribes 5.5/2 volts for A1 signals. Thus it is preferred that voltage control circuit 12 of the present invention converts the +/−12 volt RS-232 signals into 5.5/2 volt A1 signals, and vice versa.

In operation, the RS-232 connection circuit of FIG. 3 receives, via pins 10, RS-232 signals formatted by the multi-media software and routes these formatted RS-232 signals to voltage control circuit 12. Voltage control circuit 12$x$ converts the voltage of the formatted RS-232 signals from +/−12 volts of the RS-232 standard to the 5.5/2 volt requirement of the S-LINK cable bus system. The voltage-converted signals (A1 signals) are then coupled to the S-LINK cable bus system.

A1 signals, on the other hand, are received, via jack 8 and cable 6, by RS-232 connection circuit 2 and voltage-converted by voltage control circuit 12y from the 5.5/2 volt requirements of the S-LINK cable bus system to the +/−12 volt RS-232 standard. The voltage-converted signals (RS-232 signals) are then coupled, via pins 10 and the RS-232 port, to the user's computer.

Figure 4:
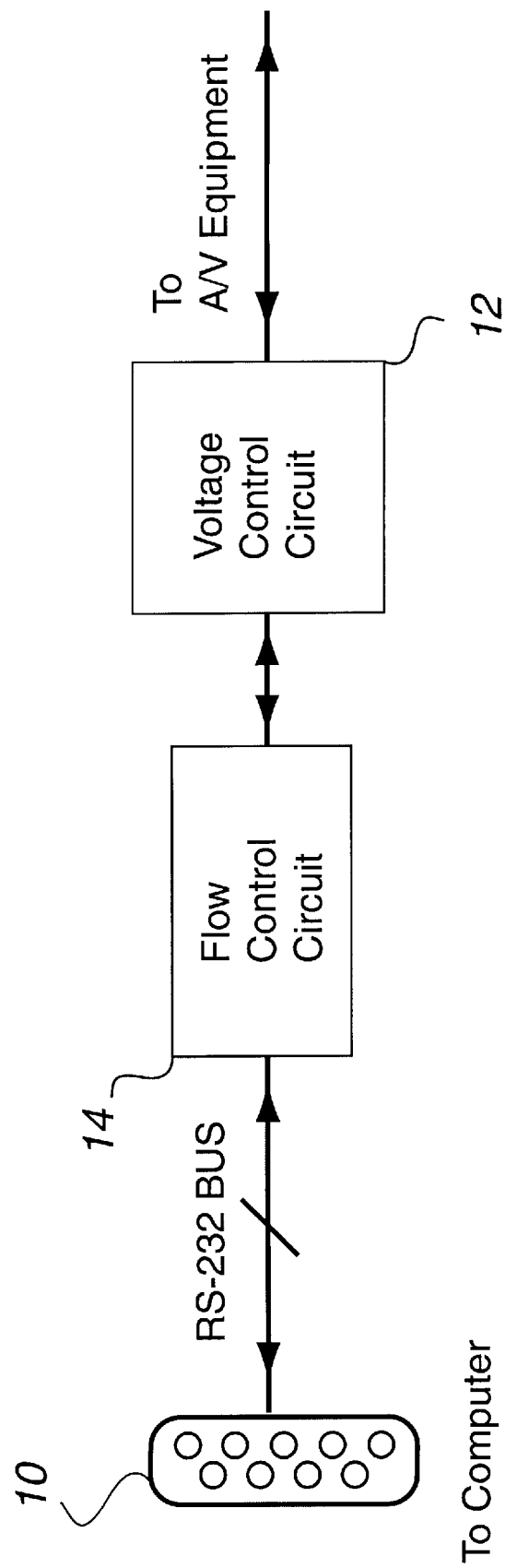
FIG. 4 illustrates another embodiment of the invention shown in FIG. 1.

As an alternative to the arrangement of FIG. 3, another embodiment of the present invention as shown in FIG. 4 includes a flow control circuit 14. With this arrangement, the second voltage control circuit (e.g. 12y) is unneeded because the flow of the RS-232 and A1 signals is controlled. Thus, bi-directional conversion of the signals between the RS-232 port and the S-LINK cable bus is performed in this embodiment by the single voltage control circuit shown.

The operation of the RS-232 connection circuit of FIG. 4 is similar to that of FIG. 3 with the exception that flow control circuit 14 controls the directional flow of the signals between the RS-232 port and the S-LINK cable bus. RS-232 signals output from the RS-232 port of the computer, for example, are directed by flow control circuit 14 to voltage control circuit 12 where the RS-232 signals are voltage-converted and coupled to the S-LINK cable bus system. A1 signals from the S-LINK cable bus, on the other hand, are voltage-controlled by voltage control circuit 12 and directed by flow control circuit 14 to the RS-232 port of the computer. In this manner, directional flow of the signals between RS-232 port and the audio/video equipment is controlled.

In addition, it is preferred that flow control circuit 14 provides timing control to match the phase of the RS-232 and A1 signals because the RS-232 port invariably operates at a different timing than the audio/video equipment of the S-LINK cable bus system. Otherwise, a special PC card must be installed in the computer for timing the RS-232 signals. With the present invention, no internal PC card is required and installation is as easy as connecting RS-232 connection circuit 2 to the RS-232 port and connecting jack 8 to the S-LINK cable bus system. It shall be appreciated that the flow control circuit 14 of the present invention further reduces both circuit complexity and cost.

Figure 5A:
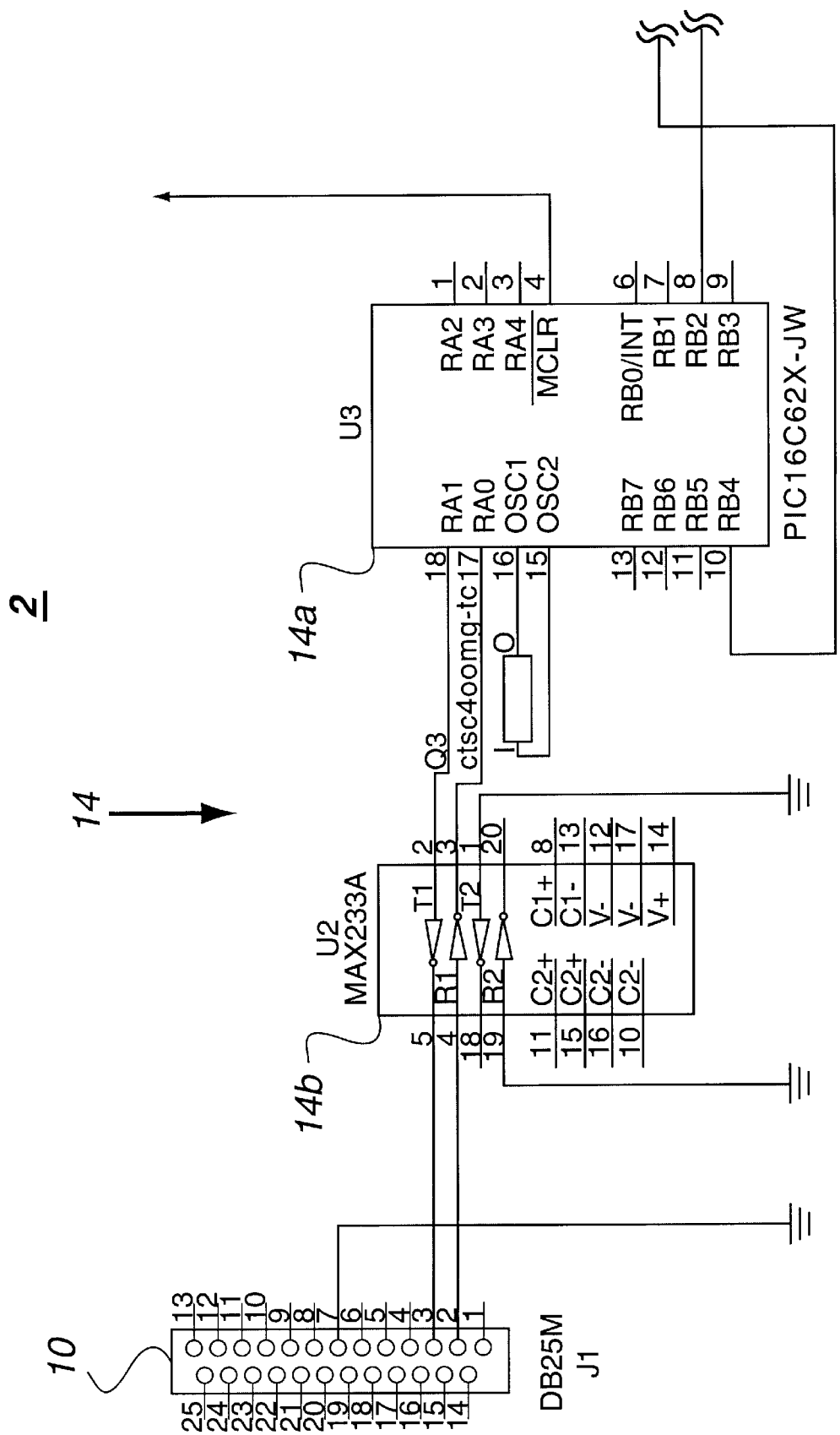
FIG. 5 is a schematic diagram of the embodiment shown in FIG. 4.
Figure 5B:
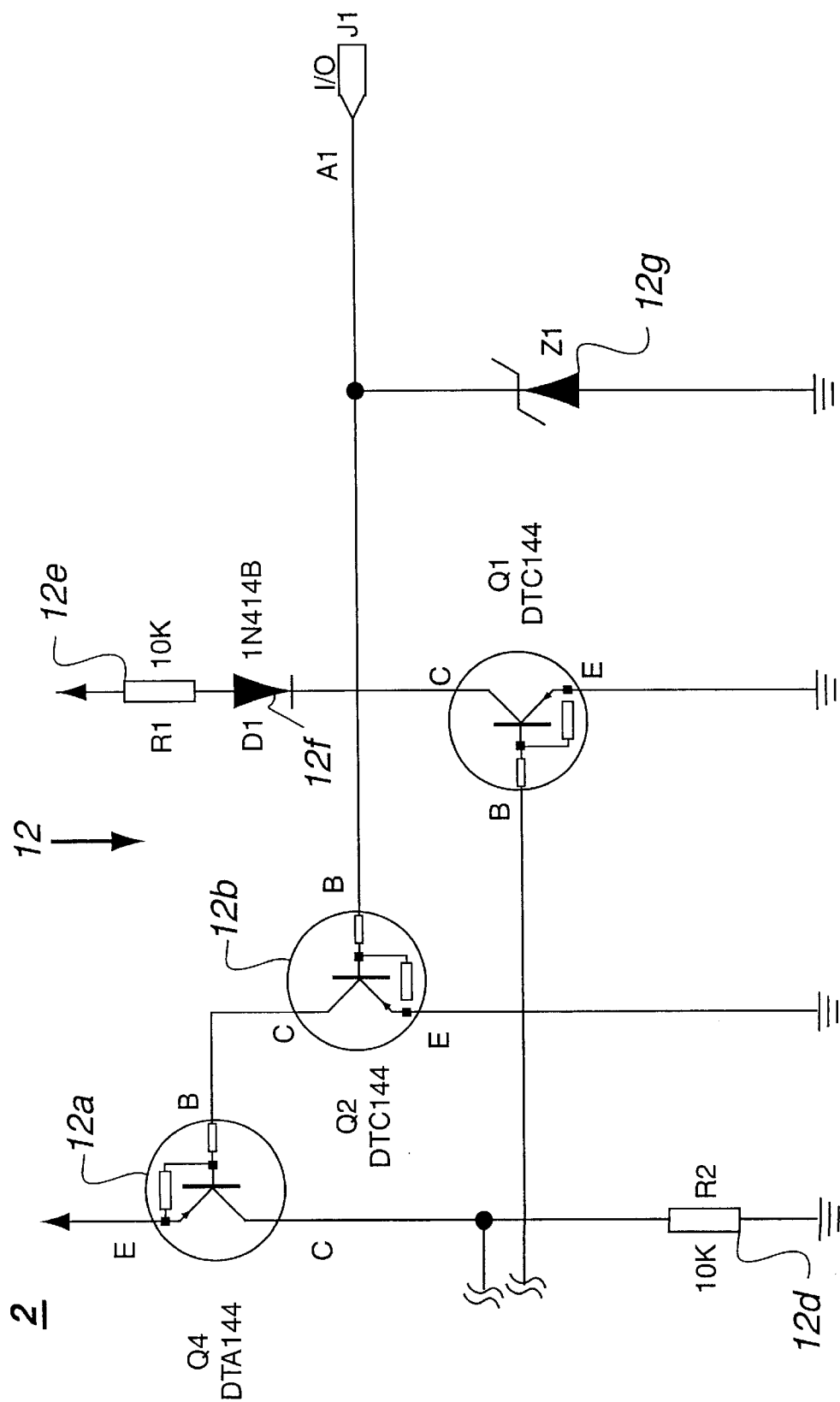
Figure 6:
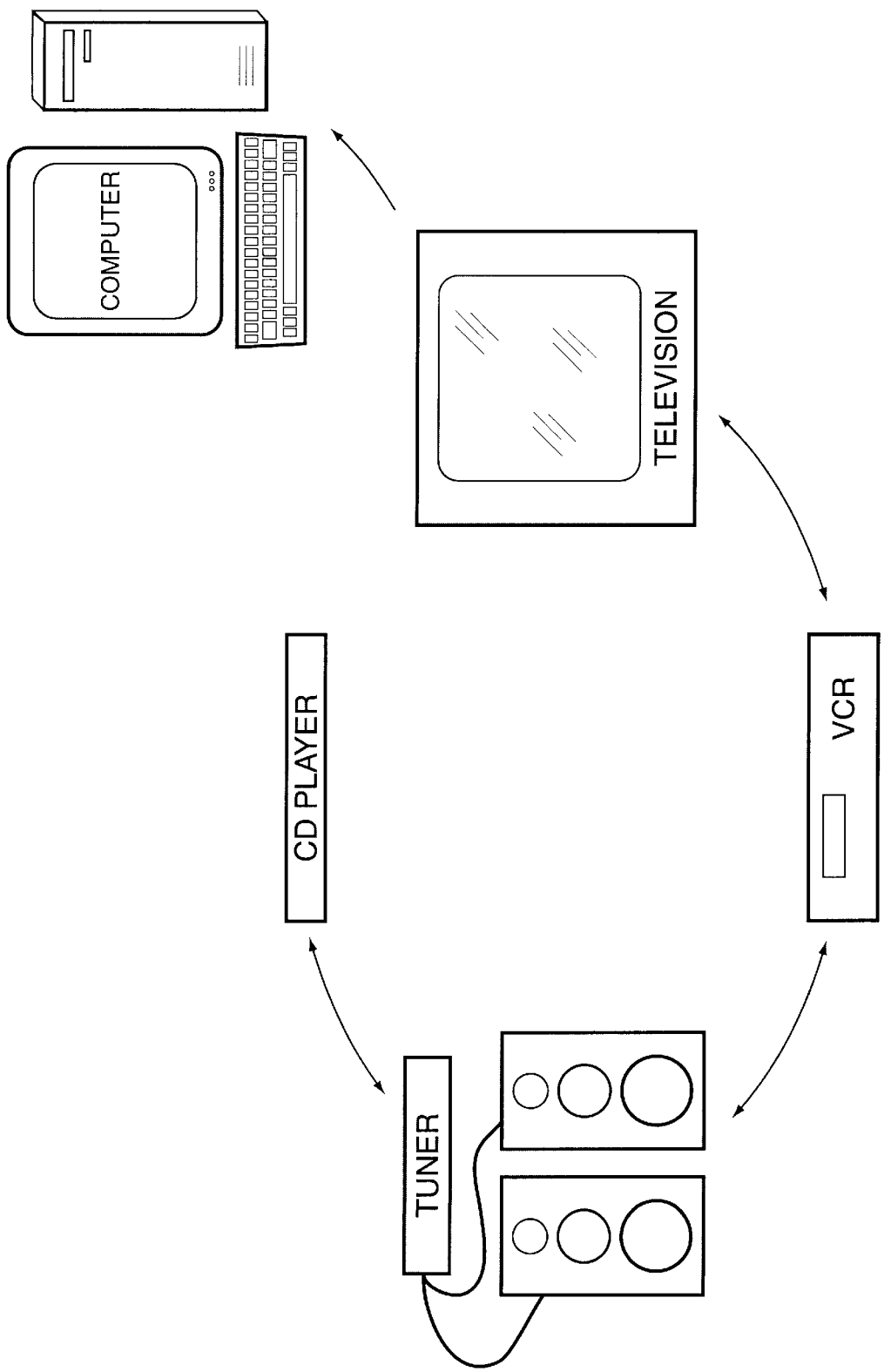
FIG. 6 illustrates an entertainment system.
Figure 7:
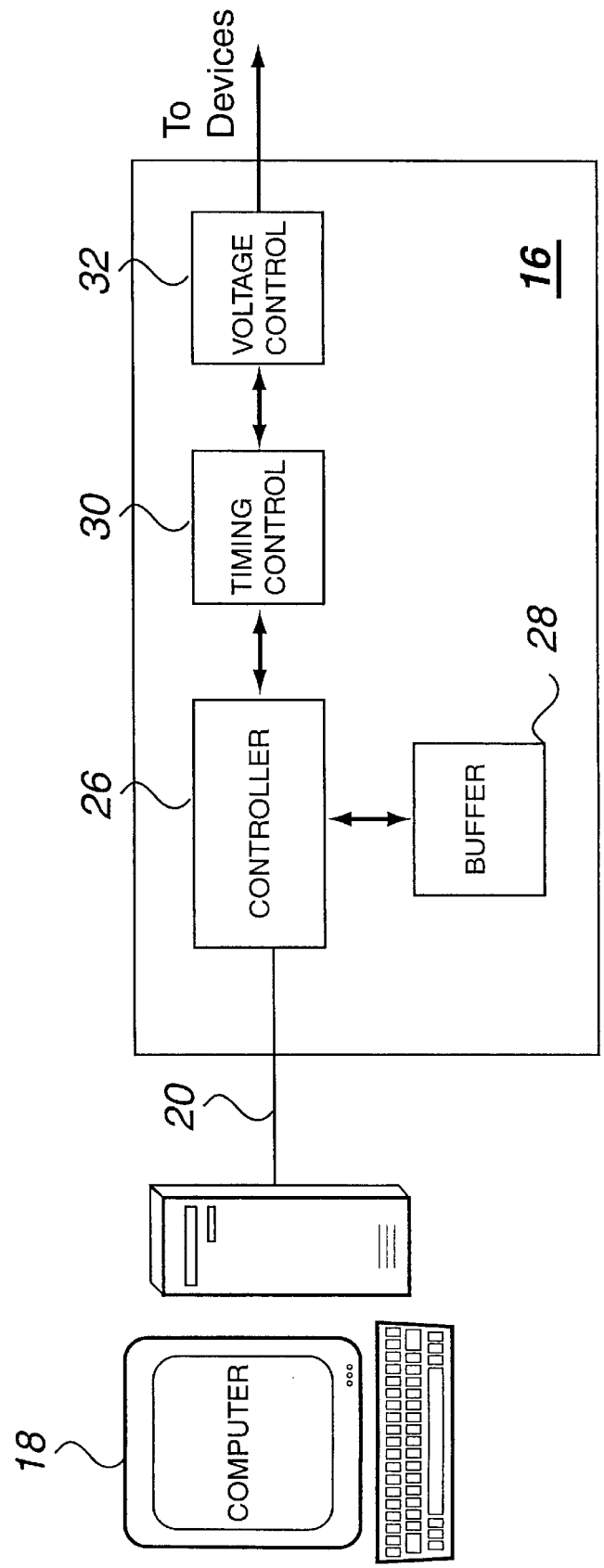
FIG. 7 illustrates the Sony Vision Touch device.

FIG. 5 shows a schematic diagram of one arrangement of the RS-232 connection circuit shown in FIG. 4. More particularly, voltage control circuit 12 is comprised of transistor-transistor logic (TTL) elements 12a–12g and flow control circuit 14 is comprised of a rectifier 14b coupled to pins 10 and a microprocessor 14a. Of course, the particular parts, circuit values and arrangement may be different than that shown in FIG. 5.

While it is preferred that pins 10 is a DB9 jack, the present invention is not limited thereby and may be, for example, a 25-pin jack as shown in FIG. 5.

In operation, RS-232 signals which are generated by the multi-media software run by the computer are coupled, via the RS-232 port, to pins 10 of the RS-232 connection circuit; and, from pin 2 thereof, the RS-232 signals are directed by rectifier 14b, via invertor R1 (pin 4 of rectifier 14b) to microprocessor 14a (pin 17 of microprocessor; RAO). Microprocessor 14a selects signals input thereto at a clock rate determined by an oscillator connected to its pins 15 and 16 (OSC1, OSC2). The RS-232 signals which are "clocked" into the microprocessor 14a are stored in a resident buffer (not shown) which is "cleared" by a control signal ($\overline{MCLR}$) applied to pin 4 of the buffer. The buffered RS-232 signals are output from microprocessor 14a at a time determined thereby through output pin 8 (RB2) to the amplifier 12c of voltage control circuit 12 which converts the voltage of the RS-232 signals output from microprocessor 14a in accordance with the voltage requirements of the S-LINK cable bus system. The resultant A1 signals are coupled to the output J1 of jack 8.

Audio/video signals, on the other hand, which are supplied from the audio/video equipment of the S-LINK cable bus entertainment system are voltage-converted by voltage control circuit 12 according to the requirements of the RS-232 standard. The voltage-controlled audio/video signals are coupled from the voltage control circuit to microprocessor 14a (pin 10; RB4) and stored in the resident buffer of the microprocessor at a clock rate established by the oscillator. The stored audio/video control signals are output from microprocessor 14a (pin 18; RA1) and coupled to rectifier 14b, whereby invertor T1 directs the signals, via pin 5 of the rectifier, to pins 10.

The voltage control circuit 12 preferably comprises a two-stage amplifier 12a, 12b which amplifies the audio/video control signals supplied from the S-LINK cable bus system, and a single-stage amplifier 12c which amplifies the RS-232 signals output from microprocessor 14a. A diode 12f limits the amplified output of amplifier 12c and zener diode 12g limits the audio/video signals supplied from the S-LINK cable bus. Hence, the voltage requirements of the RS-232 port and the S-LINK cable bus system are matched.

In operation, RS-232 signals which are output from microprocessor 14a (pin 8) are coupled to the single-stage amplifier; specifically the base of current-source transistor 12c. As a result, the single-stage amplifier is turned on, thereby causing current to flow through resistive element 12e and diode 12f to the input/output connector J1 of jack 8.

Audio/video control signals which are supplied from the S-LINK cable bus system to connector J1, on the other hand, are limited by zener diode 12g which biases the base of transistor 12b of the two-stage amplifier, thereby causing the two-stage amplifier to turn "ON" and causing transistor 12a to output the voltage across resistive element 12d to microprocessor 14a (pin 10; RB4).

It will be appreciated that the RS-232 connection circuit of the present invention provides a low-cost, power-efficient, high transfer-rate RS-232 connector/converter which couples/converts signals between an RS-232 port and an S-LINK cable bus entertainment system.

Although preferred embodiments of the present invention and modifications thereof have been described in detail herein, it is to be understood that this invention is not limited to those precise embodiments and modifications, and that other modifications and variations may be affected by one skilled in the art without departing from the spirit and scope of the invention as defined by the appended claims.

We claim:

1. In an I/O port signal conversion apparatus for converting between I/O port signals of a first voltage level selectively coupled from or supplied to an I/O port of a computer and A1 signals of a second voltage level selectively supplied to or coupled from audio/video equipment coupled by an S-LINK cable bus of an S-LINK cable bus system, wherein said computer inserts into said I/O port signals audio/video equipment headers that flag respective audio/video equipment of said S-LINK cable bus system, and wherein said audio/video equipment poll said S-LINK cable bus for said A1 signals having respective audio/video headers, said apparatus comprising:

a plug for coupling said I/O port signals and said A1 signals between said I/O port and said S-LINK cable bus system; and a voltage control circuit disposed within said plug for converting between said first voltage level of said I/O port signals and said second voltage level of said A1 signals.

2. The apparatus of claim 1, wherein said I/O port is an RS-232 port and said I/O port signals are RS-232 signals; wherein said plug connects to said RS-232 port.

3. The apparatus of claim 2, wherein said plug is substantially the same size and shape as a conventional RS-232 plug.

4. The apparatus of claim 1, wherein said I/O port is a COM port and said I/O port signals are COM port signals; wherein said plug connects to said COM port.

5. The apparatus of claim 1, wherein said I/O port is an LPT port and said I/O port signals are LPT signals; wherein said plug connects to said LPT port.

6. The apparatus of claim 1, wherein said I/O port is a USB port and said I/O port signals are USB signals; wherein said plug connects to said USB port.

7. The apparatus of claim 1, wherein said voltage control circuit comprises a first voltage control circuit for converting said first voltage level of said I/O port signals received by said plug to said second voltage level of said A1 signals; and a second voltage control circuit for converting the second voltage of said Al signals coupled from said S-LINK cable bus to said first voltage of said I/O port signals.

8. The apparatus of claim 1, further comprising a flow control circuit for controlling the flow of said I/O port signals and said A1 signals to said voltage control circuit.

9. The apparatus of claim 8, wherein said I/O port signals and said A1 signals are digital signals having a clock rate and phase; wherein said flow control circuit controls said I/O port signals to be in phase with said A1 signals.

10. The apparatus of claim 9, wherein said flow control circuit comprises a rectifier and a microprocessor and said voltage control circuit is formed of transistor-transistor logic.

11. In an I/O port signal conversion apparatus for converting between I/O port signals of a first voltage level selectively coupled from or supplied to an I/O port of a computer and A1 signals of a second voltage level selectively supplied to or coupled from audio/video equipment coupled by an S-LINK cable bus of an S-LINK cable bus system, wherein said computer inserts into said I/O port signals audio/video equipment headers that flag respective audio/video equipment of said S-LINK cable bus system, and wherein said audio/video equipment poll said S-LINK cable bus for said A1 signals having respective audio/video headers, said apparatus comprising:

a housing;

plug means disposed along a side of said housing for coupling said I/O port signals and said A1 signals between said I/O port and said S-LINK cable bus system; and voltage control means disposed within said housing for converting between said first voltage level of said I/O port signals and said second voltage level of said A1 signals.

12. The apparatus of claim 11, wherein said I/O port is an RS-232 port and said I/O port signals are RS-232 signals; wherein said plug means connects to said RS-232 port.

13. The apparatus of claim 12, wherein said housing is substantially the same size and shape as a conventional RS-232 plug.

14. The apparatus of claim 11, wherein said I/O port is a COM port and said I/O port signals are COM port signals; wherein said plug means connects to said COM port.

15. The apparatus of claim 11, wherein said I/O port is an LPT port and said I/O port signals are LPT signals; wherein said plug means connects to said LPT port.

16. The apparatus of claim 11, wherein said I/O port is a USB port and said I/O port signals are USB signals; wherein said plug means connects to said USB port.

17. The apparatus of claim 11, wherein said voltage control means comprises a first voltage control means for converting said first voltage level of said I/O port signals received by said plug means to said second voltage level of said A1 signals; and a second voltage control means for converting the second voltage of said A1 signals coupled to said S-LINK cable bus to said first voltage of said I/O port signals.

18. The apparatus of claim 11, further comprising flow control means for controlling the flow of said I/O port signals and said A1 signals to said voltage control means.

19. The apparatus of claim 18, wherein said I/O port signals and said A1 signals are digital signals having a clock rate and phase; wherein said flow control means controls said I/O port signals to be in phase with said A1 signals.

20. The apparatus of claim 19, wherein said flow control means comprises a rectifier and a microprocessor and said voltage control means comprises transistor-transistor logic.

21. In an I/O port signal conversion method for converting between I/O port signals of a first voltage level selectively coupled from or supplied to an I/O port of a computer and A1 signals of a second voltage level selectively supplied to or coupled from audio/video equipment coupled by an S-LINK cable bus of an S-LINK cable bus system, wherein said audio/video equipment poll said S-LINK cable bus for said A1 signals having respective audio/video headers, said method comprising the steps of:

inserting into said I/O port signals audio/video equipment headers that flag respective audio/video equipment of said S-LINK cable bus system;

voltage converting between said first voltage level of said I/O port signals and said second voltage level of said A1 signals; and coupling voltage-converted I/O port signals to said S-LINK cable bus and voltage-converted A1 signals to said I/O port.

22. The method of claim 21, wherein said I/O port is an RS-232 port and said I/O port signals are RS-232 signals; wherein said step of coupling couples voltage-converted RS-232 signals to said S-LINK cable bus and voltage-converted A1 signals to said RS-232 port.

23. The method of claim 21, wherein said I/O port is a COM port and said I/O port signals are COM port signals; wherein said step of coupling couples voltage-converted COM port signals to said S-LINK cable bus and voltage-converted A1 signals to said COM port.

24. The method of claim 21, wherein said I/O port is an LPT port and said I/O port signals are LPT signals; wherein said step of coupling couples voltage-converted LPT signals to said S-LINK cable bus and voltage-converted A1 signals to said LPT port.

25. The method of claim 21, wherein said I/O port is a USB port and said I/O port signals are USB signals; wherein said step of coupling couples voltage-converted USB signals to said S-LINK cable bus and voltage-converted A1 signals to said USB port.

26. The method of claim 21, wherein said step of voltage converting comprises the steps of:

converting said first voltage level of said I/O port signals to said second voltage level of said A1 signals; and converting the second voltage of said A1 signals to said first voltage of said I/O port signals.

27. The method of claim 21, further comprising the step of controlling the flow of said I/O port signals and said A1 signals.

28. The method of claim 27, wherein said I/O port signals and said A1 signals are digital signals having a clock rate and phase; wherein said step of controlling the flow controls said I/O port signals to be in phase with said A1 signals.

* * * * *